United States Patent
Strumolo et al.

(10) Patent No.: US 6,412,950 B1
(45) Date of Patent: Jul. 2, 2002

(54) VISION SYSTEM

(75) Inventors: Gary Steven Strumolo, Beverly Hills; Ronald Hugh Miller, Saline, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 196 days.

(21) Appl. No.: 09/625,435

(22) Filed: Jul. 25, 2000

(51) Int. Cl.[7] .............................................. G03B 21/00
(52) U.S. Cl. ........................................ 353/13; 348/148
(58) Field of Search ............................... 353/11, 12, 13, 353/14, 122; 396/429, 430, 544; 348/118, 148, 164

(56) References Cited

U.S. PATENT DOCUMENTS

| 4,711,544 A |   | 12/1987 | Iino et al. |
| 5,281,985 A | * | 1/1994 | Chan ........................... 353/13 |
| 5,670,935 A |   | 9/1997 | Schofield et al. |
| 5,745,173 A |   | 4/1998 | Edwards et al. |
| 5,786,772 A |   | 7/1998 | Schofield et al. |
| 5,798,575 A |   | 8/1998 | O'farrell et al. |
| 5,949,331 A |   | 9/1999 | Schofield et al. |
| 6,195,513 B1 | * | 2/2001 | Nihei et al. .................. 396/429 |
| 6,333,759 B1 | * | 12/2001 | Mazilli ........................ 348/148 |

FOREIGN PATENT DOCUMENTS

| JP | 1-141137 | 1/1989 |
| JP | 3-28039 | 3/1991 |
| JP | 7-249196 | 9/1995 |
| JP | 10-104765 | 10/1998 |

\* cited by examiner

Primary Examiner—William Dowling
(74) Attorney, Agent, or Firm—Ford Global Tech., Inc.

(57) ABSTRACT

A vision system 10 which allows images of a vehicular ambient environment 52 to be selectively acquired and displayed upon a display portion 14. The system 10 may be operatively used within vehicle 12 and may be selectively removed from the vehicle 12 and deployed within the environment 52. Further, display portion 14 is adapted to selectively acquire and display images from an entertainment type device or DVD type player 38 and/or other images from a wide variety of other sources, thereby further increasing the overall utility of the vision system 10.

20 Claims, 1 Drawing Sheet

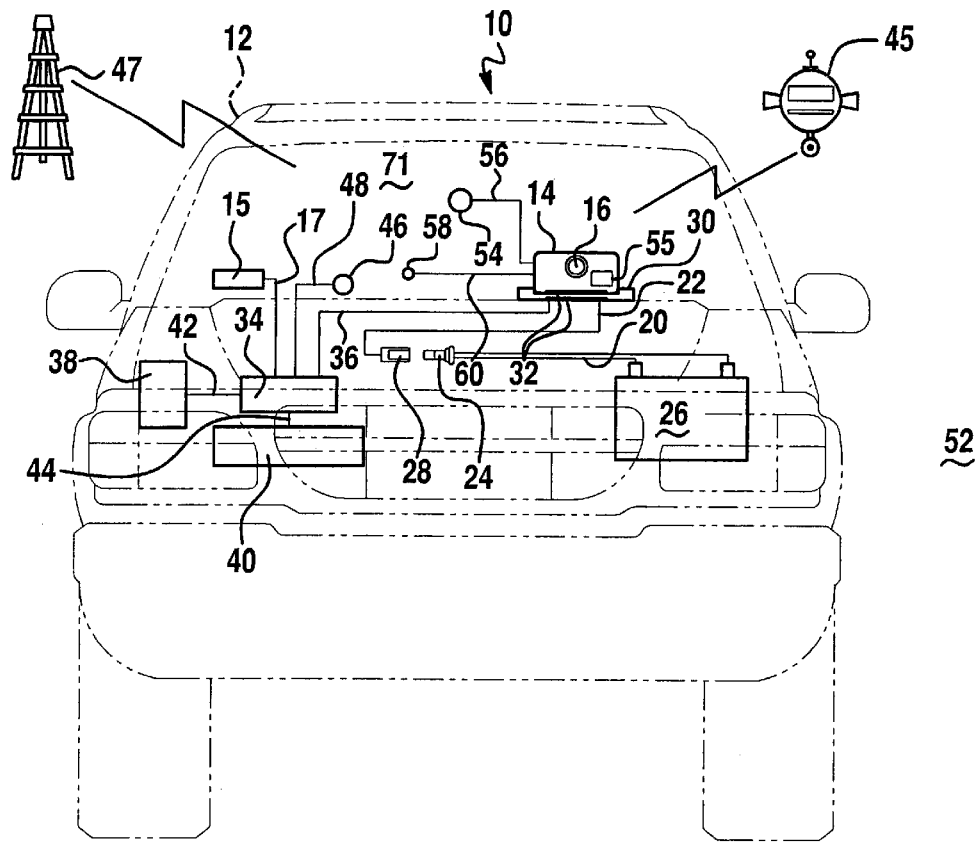
*Figure 1*
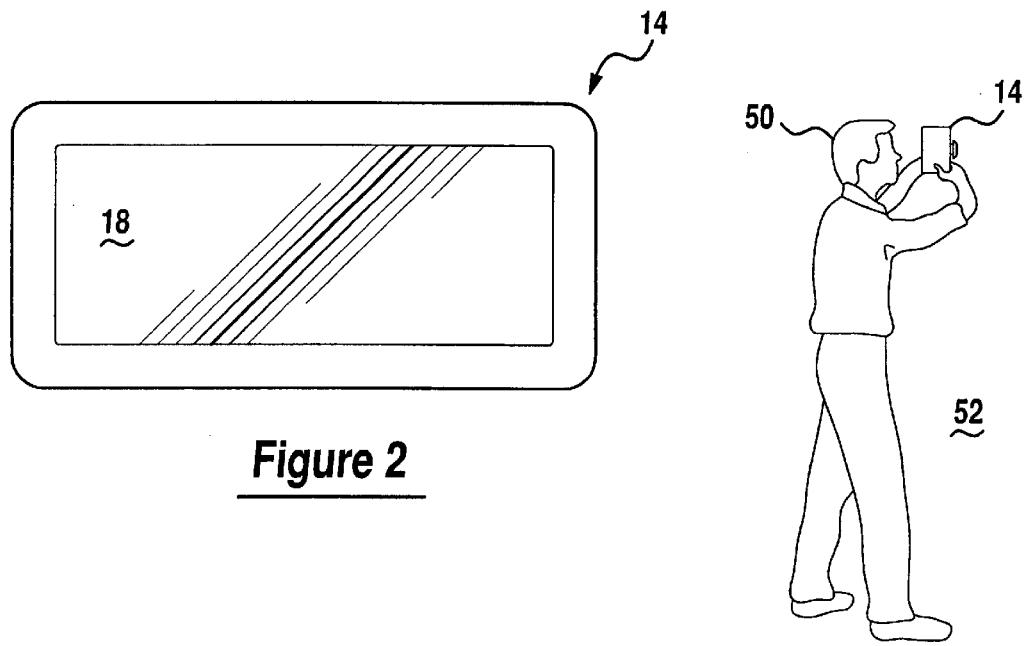
*Figure 2*
*Figure 3*

VISION SYSTEM

(1) FIELD OF THE INVENTION

The present invention generally relates to a vision system and more particularly to a portable vehicular vision system which may be selectively used to acquire and display images of objects residing proximate to a vehicle and/or images of the environment in which the vehicle resides.

(2) BACKGROUND OF THE INVENTION

Presently, cameras are deployed within and/or upon vehicles to acquire images of the ambient vehicular environment (i.e., the environment in which the vehicle resides) and/or of objects disposed within this ambient vehicular environment. Typically, these cameras are fixedly disposed upon a portion of the vehicle and are adapted to respectively receive images of objects or portions of the environment existing and/or located along a certain direction with respect to the vehicle. Further, these cameras are typically and communicatively coupled to a dedicated display screen which is substantially and only adapted to operate in combination with these cameras.

While this previously delineated configuration does allow for the selective acquisition and display of images of objects and/or a certain portion of the ambient vehicular environment, it does suffer from some drawbacks. By way of example and without limitation, these cameras and/or displays are oftentimes typically rendered inoperable upon the deactivation of the engine, thereby undesirably preventing passengers from obtaining such desired images when the vehicle is parked and inoperative. Further, such cameras and/or displays are typically rendered inoperable upon the loss of electrical power emanating from the vehicle battery, thereby preventing passengers from obtaining such images when the vehicle becomes electrically disabled. For example, a stranded motorist may particularly find these images useful in identifying potential sources of assistance and the failure of the system to provide such images in this situation may be particularly disconcerting to the vehicle owner.

Moreover, each of the cameras is typically and singularly adapted to acquire images from a certain portion of the vehicular ambient environment due to the stationary and/or fixed deployment of these cameras upon the vehicle, thereby restricting and/or undesirably limiting their usefulness and their "range" (i.e., the amount of the environment that these cameras may respectively "operate" or acquire images within).

Lastly, the dedicated display requires and occupies a relatively large amount of space within the passenger compartment, even when inoperable or deactivated. Due to the relatively limited amount of available space within the passenger compartment and the respective mounting requirements of the plethora of assemblies and devices required and/or desired to be placed within the passenger compartment, the space required by the deactivated or inoperable display assembly may prevent a certain assembly from being utilized and/or require that other desired assemblies and apparatuses be mounted in a substantially unaesthetically pleasing and/or operationally undesirable manner.

There is therefore a need for a vision system which overcomes at least some of the previously delineated drawbacks of prior vision systems and which, by way of example and without limitation, selectively allows images of the ambient vehicular environment to be selectively acquired and displayed within the vehicle.

SUMMARY OF THE INVENTION

It is a first object of the present invention to provide a vision system which overcomes at least some of the previously delineated drawbacks of prior vision systems.

It is a second object of the present invention to provide a vision system which overcomes at least some of the previously delineated drawbacks of prior vision systems and which allows images of a vehicular ambient environment to be selectively acquired and displayed within a vehicle.

It is a third object of the present invention to provide a vision system which overcomes at least some of the previously delineated drawbacks of prior vision systems and which, by way of example and without limitation, includes a portable display portion which may be selectively stored when not used.

It is a fourth object of the present invention to provide a vehicular vision system which includes an image acquisition and display portion which may be selectively and operatively used and mounted within a vehicle and which may further be operatively used outside of the vehicle and/or at various selected locations within the vehicle.

According to a first aspect of the present invention a vision system is provided. The vision system includes a display portion; a camera which is removably mounted upon the display portion and which selective acquires images and communicates the images to the display portion; and a mounting portion which selectively and removably receives the display portion.

According to a second aspect of the present invention a method is provided. The method includes the steps of providing an image acquisition and display apparatus; and removably mounting the apparatus within a vehicle.

These and other features, aspects, and embodiments of the present invention will become apparent from a reading of the detailed description of the preferred embodiment of the invention and by reference to the following drawings.

BRIEF DESCRIPTION OF THE DRAWINGS

FIG. 1 is a front view of a vehicle incorporating a vision system which is made in accordance with the teachings of the preferred embodiment of the invention;

FIG. 2 is a front view of the display portion of the vision system which is shown in FIG. 1; and FIG. 3 is a side view of an individual selectively utilizing the vision system, which is shown in FIG. 1, outside of the vehicle.

DETAILED DESCRIPTION OF THE PREFERRED EMBODIMENT OF THE INVENTION

Referring now to FIGS. 1 and 2, there is shown a vision system 10 which is made in accordance with the teachings of the preferred embodiment of the invention and which is operatively and removably deployed within a vehicle 12.

As shown, vision system 10 includes a screen or display portion or member 14 upon which a camera 16 is operatively and fixedly mounted. It should be appreciated that camera 16 may selectively comprise a "night vision" type camera or substantially any other type of commercially available camera. It should be further appreciated that display member 14 may comprise a cathode ray tube device or a "flat panel" type display device and that display member 14 is communicatively, physically, and electrically coupled to the camera 16, thereby allowing the images which are acquired or "captured" by the camera 16 to be communicated and displayed upon the screen portion 18 of display member 14.

As further shown in FIG. 1, vision system 10 includes a "cigarette style" electrical power adapter 28 which is electrically and physically coupled to a "cradle" or reception member 30 by bus 22 and which is adapted to be selectively inserted into the cigarette lighter receptacle 24 of the vehicle 12. Hence, in this manner, cigarette lighter receptacle 24, which is physically and electrically coupled to the vehicle battery 26 by bus 20, provides electrical power to the "cradle" or member 30. As shown, member 30 is adapted to selectively and removably receive the display portion 14 and is electrically, communicatively, and physically coupled to the display portion 14 by the use of the selectively engaged and cooperating electrical contact members 32.

Further, vision system 10 includes a processor 34 which is operable under stored program control and which is electrically, physically, and communicatively coupled to the cradle 30 by the use of bus 36. Vision system 10 further includes auxiliary devices 38, 40 which are respectively, physically, and communicatively coupled to the processor 34 by busses 42, 44. Devices 38, 40 may respectively comprise, by way of example and without limitation, a "DVD" type of entertainment device and a wireless communications interface device such as a "Bluetooth" type interface device which may wirelessly communicate with satellite 45 or antenna 47, thereby allowing processor 34 to access a global communications network, such as the Internet.

In operation, member 14 is selectively placed within the cradle 30 and the adapter 28 is selectively inserted into the portion or member 24, thereby allowing the member 14 to receive electrical power in the previously delineated manner from the battery 26. Camera 16 acquires images from the front of the vehicle 12 (i.e., images of that portion of the vehicular ambient environment 52 located in front of the vehicle driver) and displays these acquired images upon portion 18 of the display 14. Switch 46, which is physically and electrically coupled to the processor 34 by bus 48, selectively causes the processor 34 to prevent the acquired camera images from being displayed upon the portion 18 and to display the image data emanating from the device 38 or the images emanating and/or being received by the device 40. In this manner, display 14 may selectively perform a number of desired "functions" or operations, including allowing entertainment type images to be displayed upon portion 18 or to allow data, such as that which emanates from the Internet, to be communicated to the member 14. In other non-limiting embodiments, vision system 10 may include a keyboard 15 which is removably and communicatively coupled to processor 34 by bus 17 and which allows a user to communicate with other users of various types of networks by use of satellite 45 and/or antenna 47. Further, in other non-limiting embodiments, system 10 may include a second camera 54 which is physically, electrically, and communicatively coupled to display 14 by bus 56, and a switch 58 which is physically, electrically, and communicatively coupled to display 14 by bus 60. In this alternate embodiment, camera 54 acquires images of the portion of the vehicular ambient environment 52 located to the rear of vehicle 12 and/or of objects located to the rear of vehicle 12 (i.e., behind the vehicle driver). Switch 58 may be used to select images from one of the camera 16, 54 to be viewed upon display portion 18.

Further, as shown best in FIG. 3, portion 14 may be selectively removed from the cradle 30, by individual 50, and camera 16 may be selectively "pointed" at portions of the vehicular ambient environment 52 of interest. The portion 14, in this mode, operates by the use of a "self-contained" electrical power supply or battery 55, which may be selectively and electrically charged by the battery 26 when the portion or member 14 is placed within the cradle 30. In this manner, images may be obtained of substantially any desired portion of the ambient environment 52. Further, when not in use, display 14, which has a relatively low profile, may be stored within a glove compartment (not shown) or other portion of the vehicle 12. Further, portion 14 may be operatively used within the passenger compartment 71 of the vehicle 12 and may be used by other vehicles 12 having a substantially similar type of cradle assembly 30, thereby allowing a family, by way of example and without limitation, to share a display 14 and to use the member or display 14 within their various vehicles.

It is to be understood that the invention is not limited to the exact construction and method which has been previously delineated above, but that various changes and modifications may be made without departing from the spirit and the scope of the inventions as are more clearly set forth in the following claims.

What is claimed:

1. A vision system comprising:

a display portion;

a camera which is mounted upon the display portion and which selectively acquires images and which communicates said acquired images to said display portion; and a mounting portion which selectively and removably receives said display portion.

2. The vision system of claim 1 wherein said camera comprises a night vision type camera.

3. The vision system of claim 1 wherein said display portion includes an electrical power source.

4. The vision system of claim 1 wherein said vision system includes a wireless communications device that is communicatively coupled to said display portion.

5. The vision system of claim 1 wherein said vision system includes an entertainment device that is communicatively coupled to said display portion.

6. The vision system of claim 1 wherein said vision system includes a member which is selectively and removably insertable into a cigarette lighter.

7. A vision system for use by a vehicle of the type having a battery, said vision system comprising:

a member which is mounted within said vehicle and which is selectively coupled to said battery; and a portion that is removably secured within said member and which is adapted to acquire and display first images when secured within said member and which is further adapted to be selectively moved outside of said vehicle and to acquire and display second images when moved outside of said vehicle.

8. The vision system of claim 7 when said portion comprises a display screen and camera.

9. The vision system of claim 8 wherein said camera comprises a night vision camera.

10. The vision system of claim 8 wherein said display screen comprises a flat panel type of screen.

11. The vision system of claim 8 wherein said portion includes an electrical power supply.

12. The vision system of claim 7 wherein said vision system includes a wireless communications device that is communicatively coupled to said portion.

13. The vision system of claim 7 wherein said vision system includes an entertainment device that is communicatively coupled to said portion.

14. The vision system of claim 7 wherein said portion is movable within said vehicle and selectively acquires and displays a third image when moved within said vehicle.

15. A method comprising the steps of:
 providing an image acquisition and display apparatus;
 removably mounting said apparatus within a vehicle;
 providing a camera;
 providing a data acquisition device; and
 communicatively coupling said apparatus to a selected one of said camera and said data acquisition device.

16. The method of claim 14 wherein said camera comprises a night vision type camera.

17. The method of claim 15 wherein said data acquisition device comprises a device that selectively accesses a global communication network.

18. The method of claim 14 further comprising the step of coupling said apparatus to a vehicle battery.

19. The method of claim 14 further comprising the steps of:
 providing an electrical power supply; and
 placing said electrical power supply within said apparatus.

20. The method of claim 14 wherein said vehicle includes a passenger compartment, said method further comprising the steps of acquiring images of said passenger compartment.

* * * * *